United States Patent
Hsu et al.

(10) Patent No.: US 8,876,072 B2
(45) Date of Patent: Nov. 4, 2014

(54) HOLDER AND SUCKER THEREOF

(75) Inventors: Wen-Sheng Hsu, Taoyuan (TW); Chih-Kuang Wang, Taoyuan (TW); Ching-Liang Chiang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 757 days.

(21) Appl. No.: 12/685,071

(22) Filed: Jan. 11, 2010

(65) Prior Publication Data
US 2010/0282928 A1 Nov. 11, 2010

(30) Foreign Application Priority Data
May 5, 2009 (TW) .............................. 98114811 A (51) Int. Cl.
*A45D 42/14* (2006.01)
*F16B 47/00* (2006.01)

(52) U.S. Cl.
CPC ............... *F16B 47/00* (2013.01); *F16B 47/003* (2013.01)
USPC ....................... 248/205.5; 248/363; 248/205.7

(58) Field of Classification Search
CPC ........ F16B 47/00; F16B 47/006; A45D 42/14
USPC .......... 248/205.5, 205.7, 205.6, 205.8, 206.1, 248/206.2, 363, 362, 683
See application file for complete search history.

(56) References Cited

U.S. PATENT DOCUMENTS

| | | | | | |
|---|---|---|---|---|---|
| 1,840,400 | A | * | 1/1932 | Lebherz | 248/362 |
| 2,657,893 | A | * | 11/1953 | Puckert | 248/205.8 |
| 2,968,460 | A | * | 1/1961 | van Dusen | 248/205.3 |
| 3,051,117 | A | * | 8/1962 | Hunter, Jr. | 114/296 |
| 3,180,604 | A | * | 4/1965 | Hammer | 248/205.8 |
| 3,976,274 | A | * | 8/1976 | Langguth | 248/363 |
| 4,133,575 | A | * | 1/1979 | Mader | 296/95.1 |
| 4,356,989 | A | * | 11/1982 | Ireland | 248/205.9 |
| 5,133,524 | A | * | 7/1992 | Liu | 248/205.8 |
| 6,234,435 | B1 | * | 5/2001 | Yeh | 248/205.5 |
| 6,478,271 | B1 | * | 11/2002 | Mulholland | 248/205.8 |
| 7,007,908 | B2 | * | 3/2006 | Tsay | 248/309.3 |
| 7,066,434 | B2 | * | 6/2006 | Kwok | 248/205.8 |

(Continued)

FOREIGN PATENT DOCUMENTS

CN 101174477 5/2008
DE 102007057889 A1 * 6/2009

(Continued)

OTHER PUBLICATIONS

Search Report from corresponding EPO Application No. 10 150 662.4 dated Mar. 15, 2010.

(Continued)

*Primary Examiner* — Kimberly Wood
(74) *Attorney, Agent, or Firm* — Grossman, Tucker, Perreault & Pfleger, PLLC (57) ABSTRACT

A holder and a sucker thereof for mounting onto the surface of an object are provided. The sucker has an adhesive layer and a deformable body which is disposed on the edge of the adhesive layer. The holder further includes a rod and a locking module. An end of the rod is connected to the sucker. The locking module is disposed on the sucker and is adapted to lift the rod to form a low pressure space. Thus, the holder and the sucker can be positioned onto the surface of the object.

8 Claims, 12 Drawing Sheets

(56) References Cited

U.S. PATENT DOCUMENTS

| | | | |
|---|---|---|---|
| 7,293,750 B2 * | 11/2007 | Richter | 248/205.5 |
| 7,469,868 B2 * | 12/2008 | Bury | 248/205.8 |
| 7,516,926 B2 * | 4/2009 | Liu | 248/205.5 |
| 7,575,208 B2 * | 8/2009 | Lan | 248/205.3 |
| 7,628,362 B2 * | 12/2009 | Song | 248/205.8 |
| 7,661,638 B2 * | 2/2010 | Yu | 248/205.8 |
| 7,690,609 B2 | 4/2010 | Akai et al. | |
| 7,690,610 B2 * | 4/2010 | Ristau | 248/206.2 |
| 7,793,899 B2 * | 9/2010 | Fan | 248/206.2 |
| 7,878,467 B2 * | 2/2011 | Chen et al. | 248/206.2 |
| 2002/0175250 A1 * | 11/2002 | Lian | 248/205.5 |
| 2007/0018064 A1 * | 1/2007 | Wang | 248/274.1 |
| 2007/0023594 A1 * | 2/2007 | Choi et al. | 248/205.5 |
| 2007/0075196 A1 * | 4/2007 | Richter | 248/205.8 |
| 2007/0090234 A1 * | 4/2007 | Liao | 248/127 |
| 2007/0120027 A1 | 5/2007 | Chang | |
| 2007/0152119 A1 * | 7/2007 | Wang | 248/205.5 |
| 2007/0262217 A1 | 11/2007 | Wang et al. | |
| 2008/0048083 A1 * | 2/2008 | Takahashi et al. | 248/363 |
| 2008/0224009 A1 | 9/2008 | Song | |
| 2008/0230662 A1 * | 9/2008 | Takahashi et al. | 248/206.2 |
| 2008/0245935 A1 * | 10/2008 | Kaneda et al. | 248/206.2 |
| 2008/0308693 A1 * | 12/2008 | Kim | 248/205.8 |

FOREIGN PATENT DOCUMENTS

| | | |
|---|---|---|
| EP | 0 775 462 | 5/1997 |
| TW | M298663 | 10/2006 |
| TW | 200809106 | 2/2008 |
| TW | 200809107 | 2/2008 |
| WO | 2005/035999 | 4/2005 |
| WO | 2007/117130 | 10/2007 |
| WO | 2008/123692 | 10/2008 |

OTHER PUBLICATIONS

Office Action from corresponding EPO Application No. 10 150 662.4 dated Mar. 26, 2010.

* cited by examiner

HOLDER AND SUCKER THEREOF

This application claims the benefit from the priority to Taiwan Patent Application No. 098114811 filed on May 5, 2009, the disclosure of which is incorporated by reference herein in its entirety.

CROSS-REFERENCES TO RELATED APPLICATIONS

Not applicable.

BACKGROUND OF THE INVENTION

1. Field of the Invention

The present application provides a holder and sucker thereof for mounting on a curved or patterned surface.

2. Descriptions of the Related Art

Driven by the advancement in science and technology as well as demands of various applications, electronic devices with various functions such as mobile phones, global positioning system (GPS) devices, audio & video players and the like have become increasingly popular and are becoming smaller for portability. If an electronic device is to be used by a user at irregular times on a non-continuous basis, the electronic device will need to be disposed near the user for use at any time, an example of which is the GPS device that is used during traveling. In such a case, the electronic device is usually disposed, in a configuration that facilitates the operation, at a specific location by means of an appropriate holder.

A conventional holder is mounted onto a surface of an object by using a sucker to form a low-pressure space therein so that the holder can be fixed to the object. In more detail, a shell is used to hold down the edge of the sucker to form the low-pressure space. However, the shell made of a hard material is typically formed with a planar rim and, thus, can only be mounted on flat and smooth surfaces. For example, when a GPS device needs to be placed inside a vehicle, the GPS device can usually only be disposed on the windshield.

If an inappropriate location is chosen to mount the holder, for example, the sucker being mounted onto a surface with a non-planar surface, it is very likely that the low-pressure space cannot be formed. Even if the low-pressure space is formed, in case the vehicle shakes or vibrates, the sucker will be impossible to maintain the low-pressure space and the holder will be separated. Additionally, for dashboards having a patterned surface, the sucker will be even more impossible for mounting on the patterned surface.

These limitations to the holder represent a considerable inconvenience to the user, and it will be more dangerous for the user if the holder is separated during the operation of the vehicle.

SUMMARY OF THE INVENTION

The present application is to provide a holder and a sucker capable of delivering a stable mounting effect.

A holder and a sucker thereof for mounting onto a surface of an object are disclosed in the present application. The holder further includes a rod and a locking module. The sucker includes an adhesive layer and a deformable body. The deformable body includes a hollow pad being disposed on the adhesive layer. A first end of the rod is connected to the sucker, and the locking module is disposed on the sucker to lift the rod for operatively affixing the sucker onto the object.

The detailed technology and embodiments are described in the following paragraphs accompanying the appended drawings for people skilled in this field to well appreciate the features of the claimed application.

DESCRIPTION OF THE PREFERRED EMBODIMENT

Figure 1:
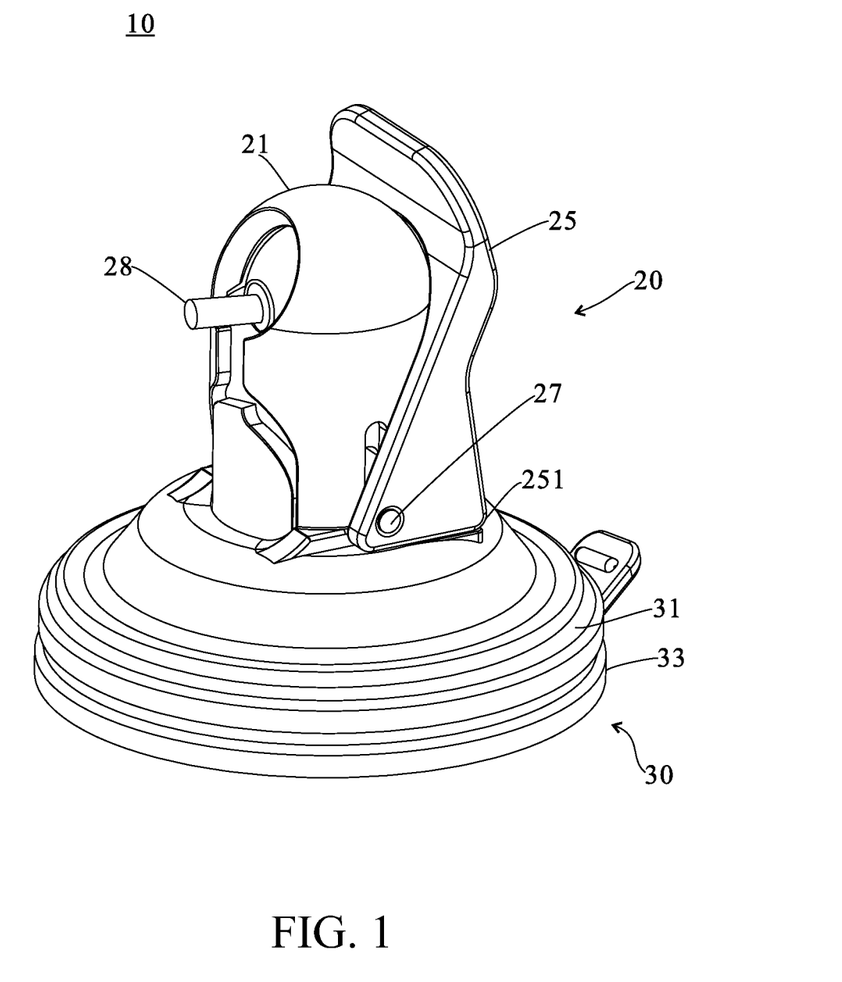
FIG. 1 is a perspective view of a holder in an unlocked status according to the first embodiment of the present invention.
Figure 11:
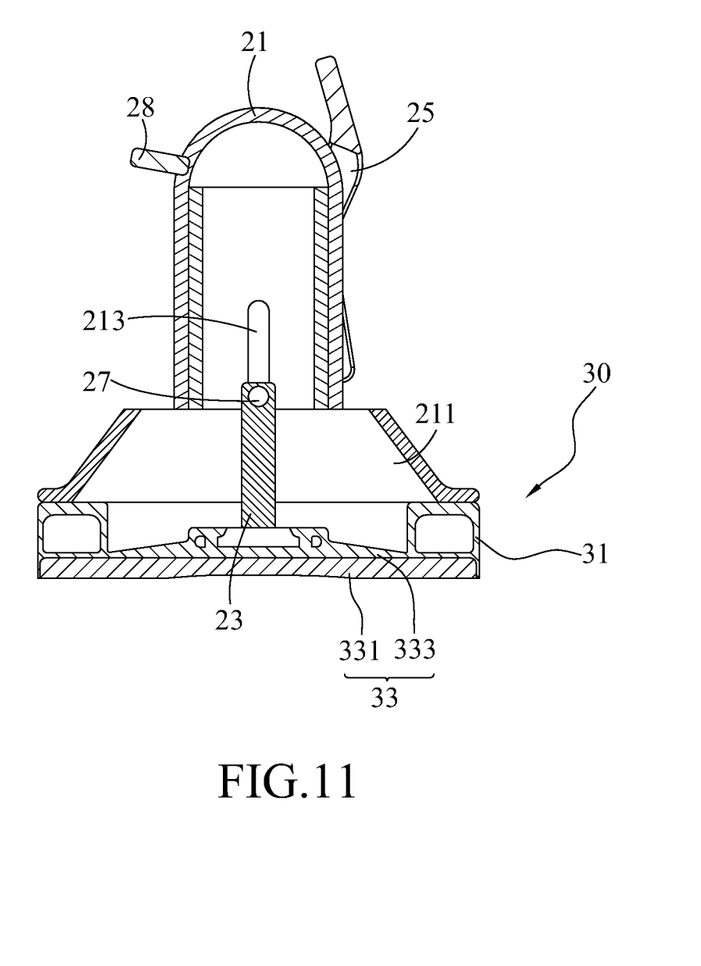
FIG. 11 is a schematic cross-sectional view of the holder of the first embodiment in an unlocked status.

FIGS. 1 through 3 and FIGS. 11 through 12 illustrate a holder 10 according to the first embodiment of the present invention. FIG. 1 is a schematic view of the holder 10 in an unlocked status and FIG. 11 is a schematic cross-sectional view of FIG. 1. The holder 10 includes a locking module 20, a rod 23 and a sucker 30. The locking module 20 is disposed on the sucker 30.

Figure 2:
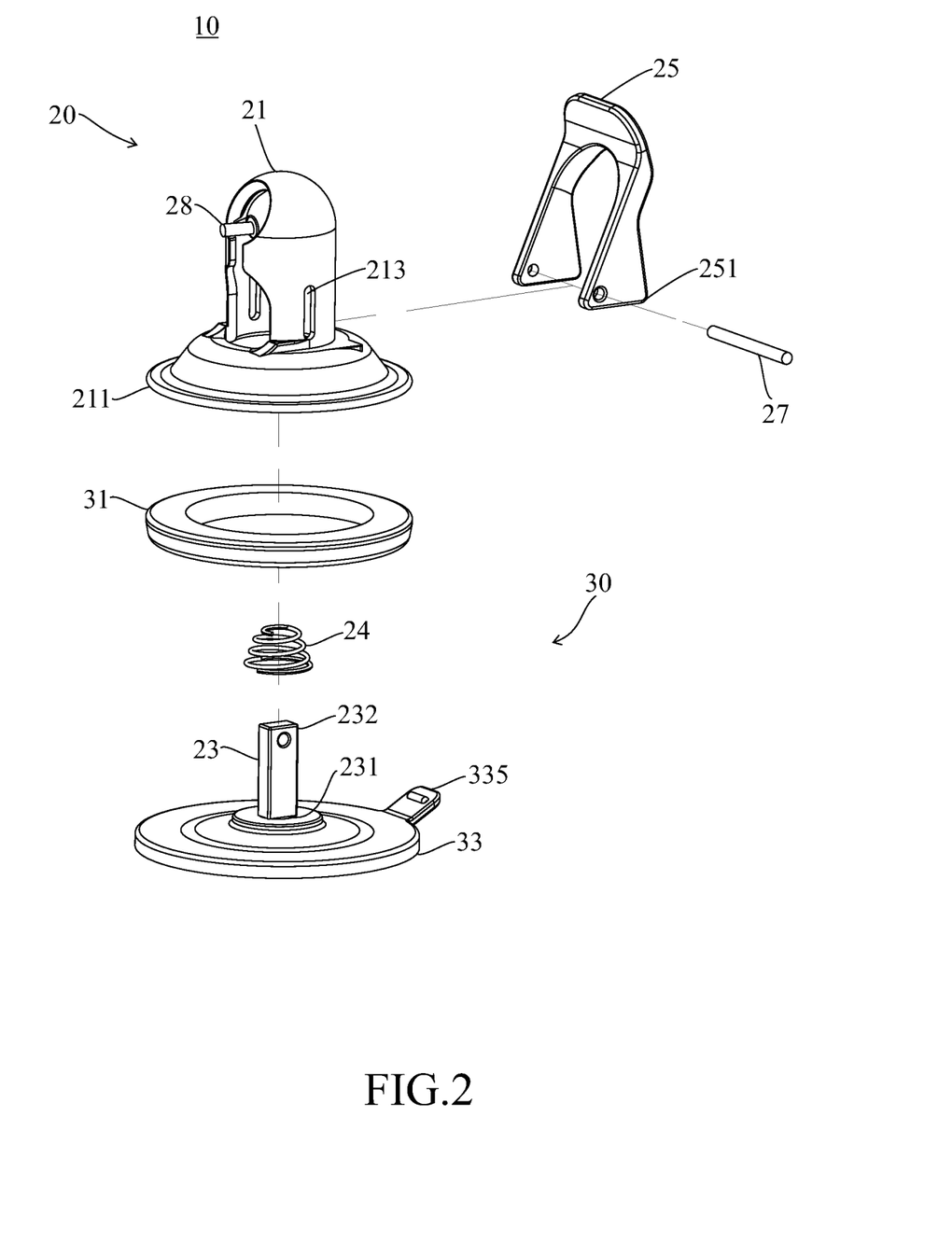
FIG. 2 is a schematic exploded view of the holder of the first embodiment.

FIG. 2 illustrates an exploded view of the holder 10. The sucker 30 includes a deformable body 31 and an adhesive layer 33. The deformable body 31 is disposed on the edge of the adhesive layer 33. The deformable body 31 may be a hollow pad in which a fluid or tiny particles are filled to provide expected deformability. However, the filler in the deformable body 31 is not limited to the materials disclosed in the present application. In fact, the deformable body 31 can conform to the curvature variations of the surface of the object 50 as long as it has a certain thickness.

In this embodiment, the locking module 20 includes an outer housing 21, a handle 25 and a pivot 27. The outer housing 21 is disposed on the sucker 30 and has a rim 211 adapted to thrust against the edge of the deformable body 31. A first end 231 of the rod 23 is connected to the central portion of the sucker 30. In reference to FIG. 4, the adhesive layer 33 may include a first layer 331 and a second layer 333, in which the first layer 331 is adhesive. The first layer 331 and the second layer 333 are preferably integrated, for example, are formed in separate processes under different processing conditions. The second layer 333 wraps the first end 231 of the rod 23 and has an adequate strength.

Additionally, the handle 25 is pivoted to the second end 232 of the rod 23 via the pivot 27, and the outer housing 21 has a first slot 213 for the pivot 27 to pass therethrough. For assembly of the locking module 20, the pivot 27 is inserted sequentially through the handle 25, the first slot 213 of the outer housing 21 and the second end 232 of the rod 23.

Figure 3:
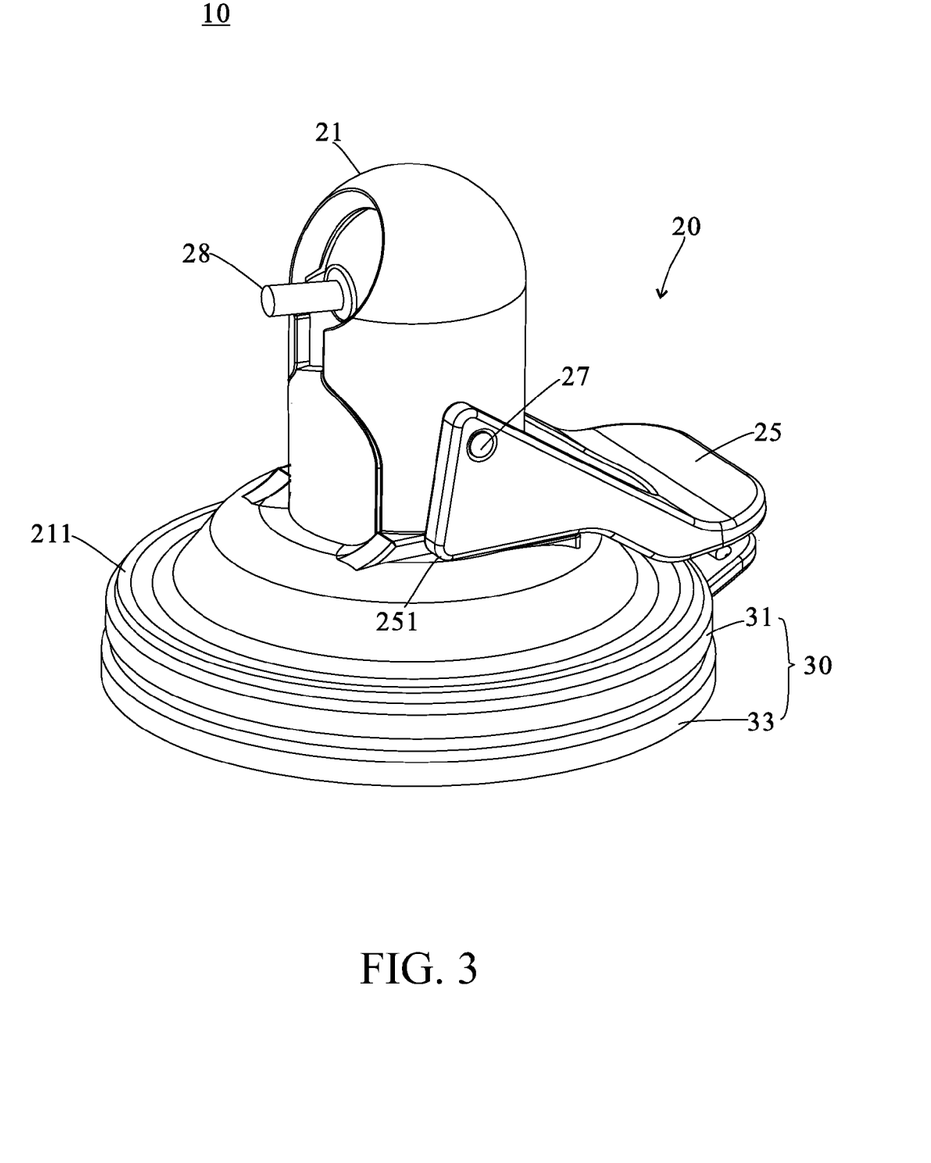
FIG. 3 is a perspective view of the holder of the first embodiment in a locked status.
Figure 12:
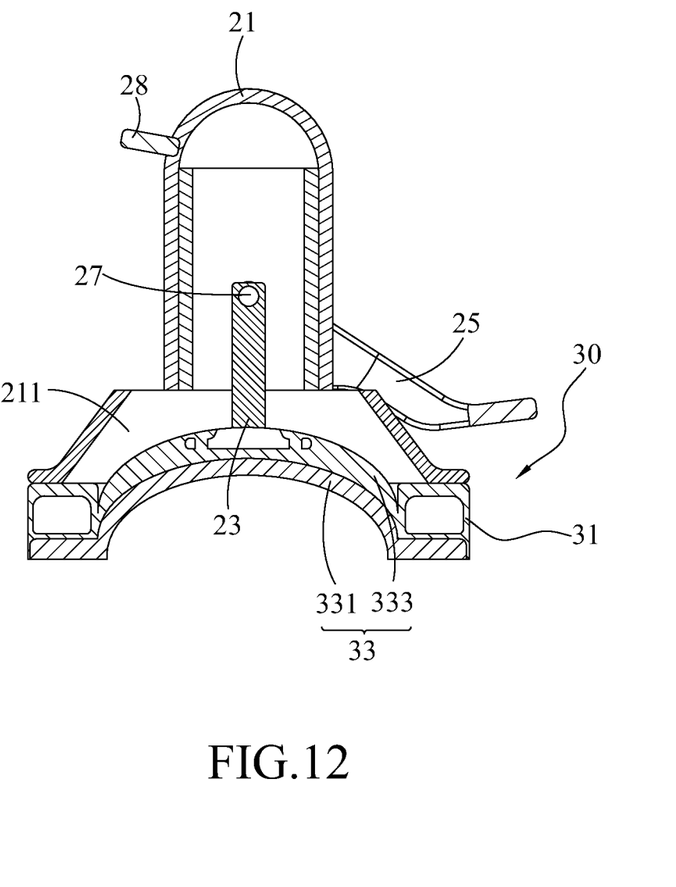
FIG. 12 is a schematic cross-sectional view of the holder of the first embodiment in a locked status.

In reference to FIGS. 3 and 12, the handle 25 further has a fulcrum end 251. When the user presses down the handle 25 to drive the holder 10 into the locked status, the fulcrum end 251 will lean against the outer housing 21 so that the outer housing 21 is pressed against the deformable body 31 at the edge thereof. Meanwhile, with the fulcrum end 251, the pivot 27 is lifted upwards by the handle 25 to slide upwards along the first slot 213 of the outer housing 21, thereby lifting the rod 23. Conceivably, the upward lifting of the rod 23 relative to the deformable body 31 will also lift the central portion of the sucker 30 synchronously while the rim 211 of the outer housing 21 still presses against the edge of the sucker 30 to fix the edge of the sucker 30. As a result, a low-pressure space is formed between the adhesive layer 33 and the object. With this structure, a force provided by the locking module 20 can be applied to the edge of the sucker 30 to fix the sucker 30 onto the object, thereby mounting the holder 10 onto the surface of the object.

Additionally, the holder 10 further includes a connecting module 28 disposed on the locking module 20 for connection with a handheld electronic device (not shown). For example, the connecting module 28 may be a fixed or an adjustable structure, e.g., a ball joint, a flexible pipe or the like, which allows for the easy adjustment of the displaying angle exhibited by the electronic device. The holder 10 may further include an elastic member 24, e.g., a spring, disposed over the rod 23, and when the handle 25 is driven into the locked status, the elastic member 24 will be compressed to store elastic potential energy. Once the handle 25 is released, the elastic potential energy of the elastic member 24 will be released to drive other elements including the outer housing 21 back to the unlocked original position. Additionally, the adhesive layer 33 may further include a release member 335. After the handle 25 has been released by the user to drive the holder into the unlocked status, the release member 335 may be further operated by the user to make the air flowing into the low-pressure space, thereby separated the holder 10.

Figure 5:
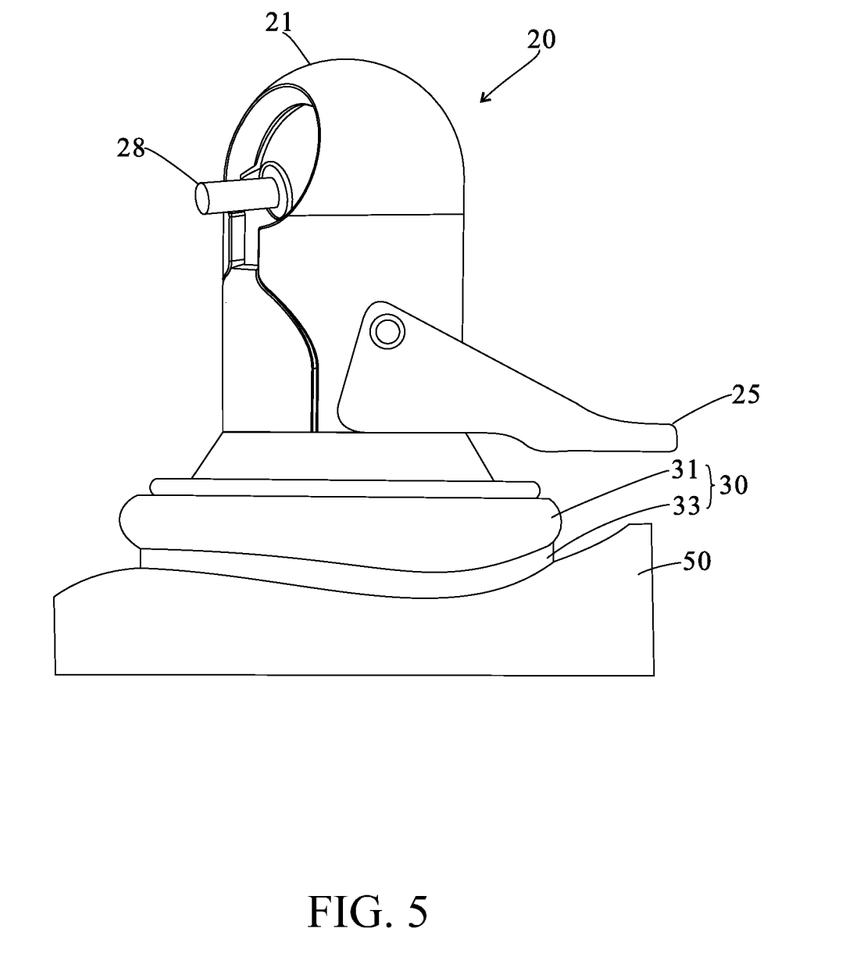
FIG. 5 is a schematic view of the holder of the first embodiment when mounted to a curved surface.

In reference to FIG. 5, as compared to the prior art which can only use a solid outer housing to press against the adhesive layer and thus can only be used with smooth and flat surfaces, this embodiment is unique in that the holder 10 further includes a deformable body 31. When a force provided by the locking module 20 is applied to the edge of the sucker 30, the force can be applied on the adhesive layer 33 with the deformable body 31 so that the sucker 30 is mounted on the surface of the object 50. As a result, even if the object 50 has a non-flat surface (e.g., a curved or patterned surface), the deformable body 31 can still force the adhesive layer 33 to be attached onto the non-flat surface. In more detail, due to the edge portion of the sucker 30 is deformable, the edge portion of the sucker 30 can match and complement the curved surface of the object 50. Consequently, a low-pressure space can still be formed between the adhesive layer 33 and the surface of the object 50 even if the rim 211 of the outer housing 21 that is made of a hard material.

Figure 7:
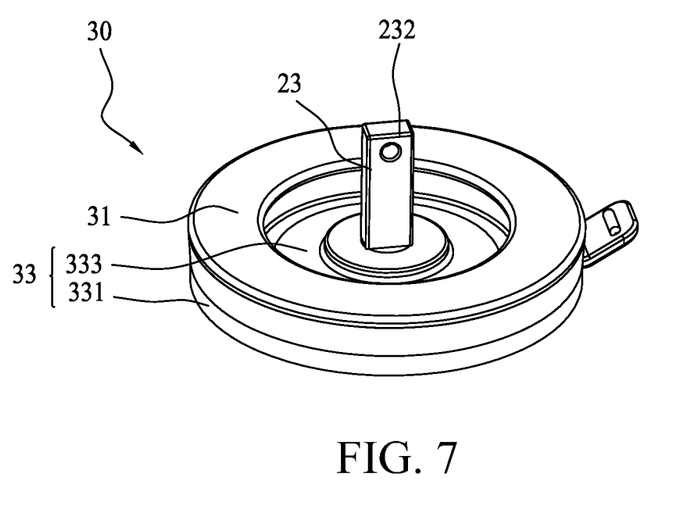
FIG. 7 is a perspective view of a deformable body and an adhesive layer that are integrated together.
Figure 8:
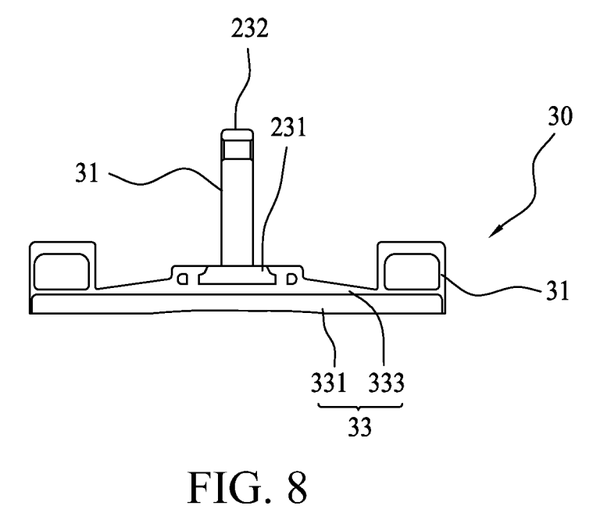
FIG. 8 is a schematic cross-sectional view of the deformable body and the adhesive layer that are integrated together.

Apart from having the deformable body 31 and the adhesive layer 33 attached to each other, the present application further discloses the integration of the deformable body 31 and the adhesive layer 33, as shown in FIGS. 7 and 8. FIG. 7 is a perspective view of a sucker 30, and FIG. 8 is a central cross-sectional view of the sucker 30 shown in FIG. 7. As can be seen clearly from these figures, the deformable body 31 and the adhesive layer 33 are formed integrally. In more detail, a hollow pad is formed on the edge of the second layer 333 and then is filled with a fluid or tiny particles to form the deformable body 31. Thus, the deformable body 31 and the adhesive layer 33 modularly form a sucker 30. This is provided as another approach, and the present application is not limited to this approach.

Figure 4:
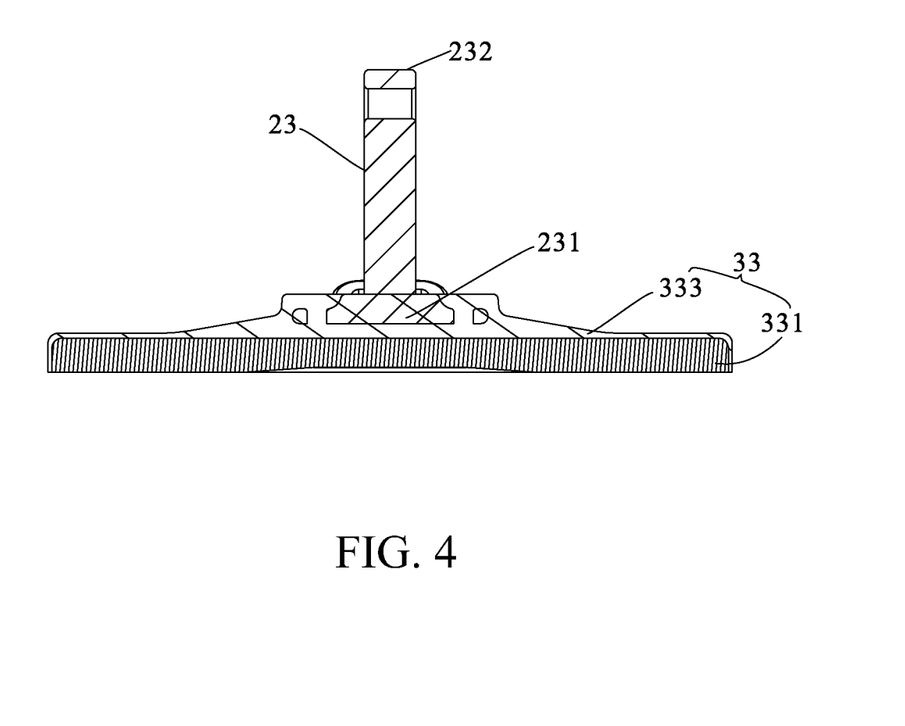
FIG. 4 is a schematic cross-sectional view of a rod and an adhesive layer.
Figure 6:
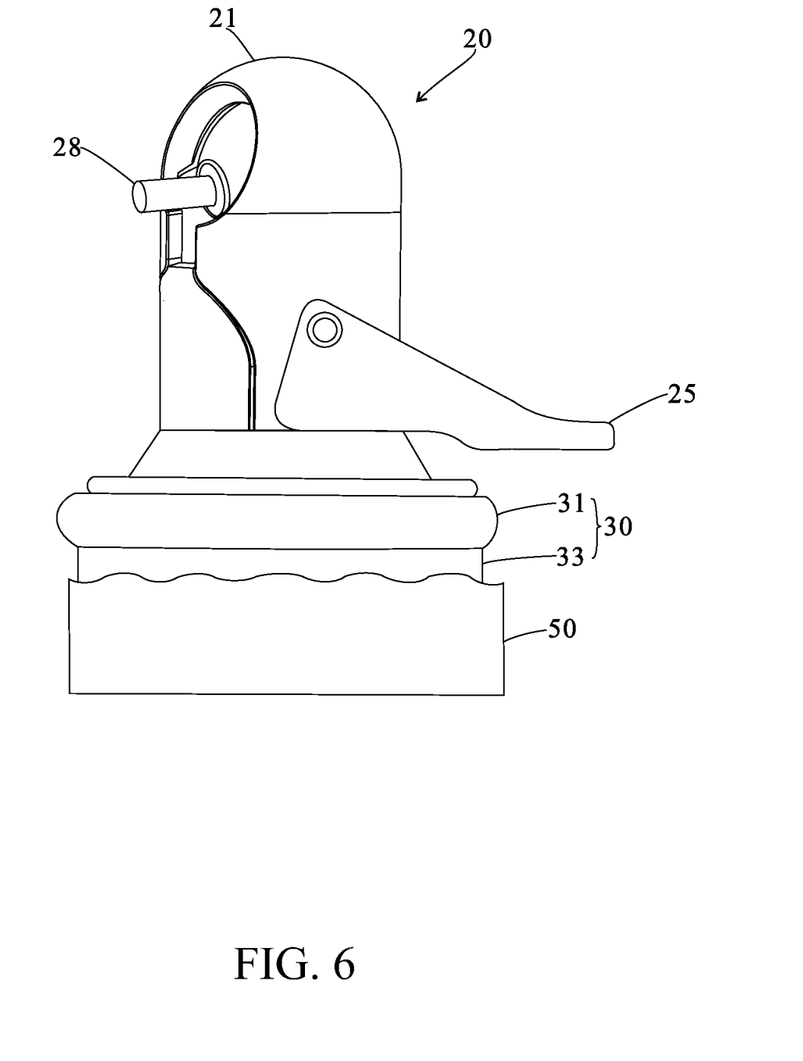
FIG. 6 is a schematic view of the holder of the first embodiment when mounted to a patterned surface.

In reference to both FIGS. 4 and 6 together, in the present embodiment, the first layer 331 of the adhesive layer 33 may be made of an adhesive flexible material, for example, a viscose like material. Thus, the first layer 331 can be effectively attached onto the patterned surface of the object 50, so the holder 10 of the present embodiment is applicable to be mounted on the patterned surfaces, for example, dashboards and the like.

Figure 9:
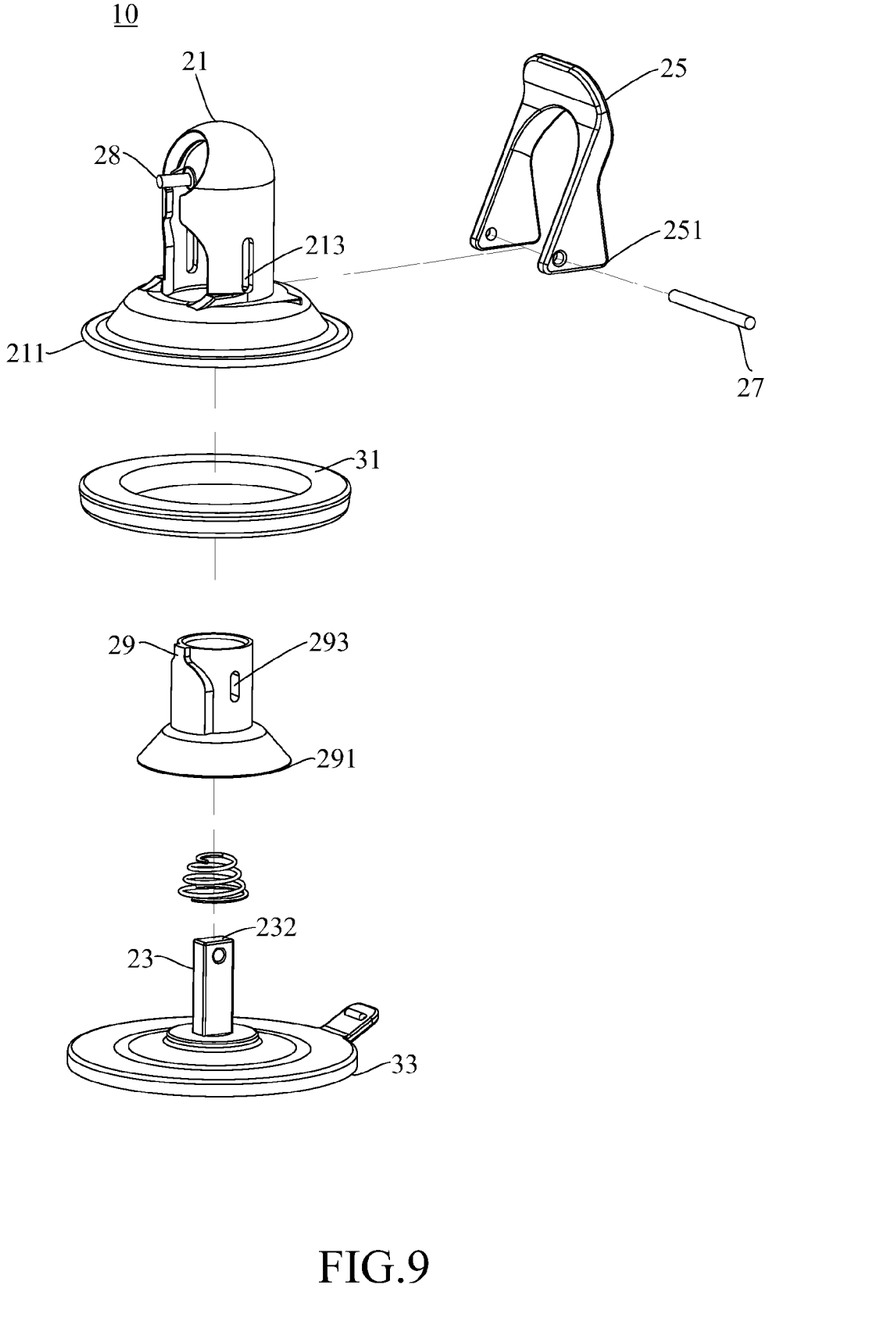
FIG. 9 is a schematic exploded view of the second embodiment of the present invention.

The second embodiment of the present invention is shown in FIG. 9. Based on the structure of the previous embodiment, the locking module 20 of the holder 10 of this embodiment further includes an inner shell 29 adapted to be received inside the outer housing 21. The inner shell 29 has a rim 291 and a second slot 293 for the pivot 27 to pass therethrough and slide therein. When the handle 25 is actuated by the user to drive the holder 10 into the locked status so that a force is applied by the fulcrum end 251 to the outer housing 21 to press the rim 211 of the outer housing 21 against the edge of the deformable body 31, the outer housing 21 will also drive the rim 291 of the inner shell 29 downward to press against the adhesive layer 33. The open end of the inner shell 29 has a smaller rim 291, and when the rod 23 is lifted upwards and the inner shell 29 is, along with the outer housing 21, pressed downwards against the adhesive layer 33, this helps to limit the range of the low-pressure space and have it concentrated towards the central area of the adhesive layer 33. In this way, a larger contact area will be obtained between the adhesive layer 33 and the object 50 when the holder 10 is mounted onto the surface of the object 50, which makes it easier to maintain the low-pressure space. Hence, it is less likely for the holder to be separated even when being shaken by an external force, thereby further improving the suction stability thereof.

Figure 10:
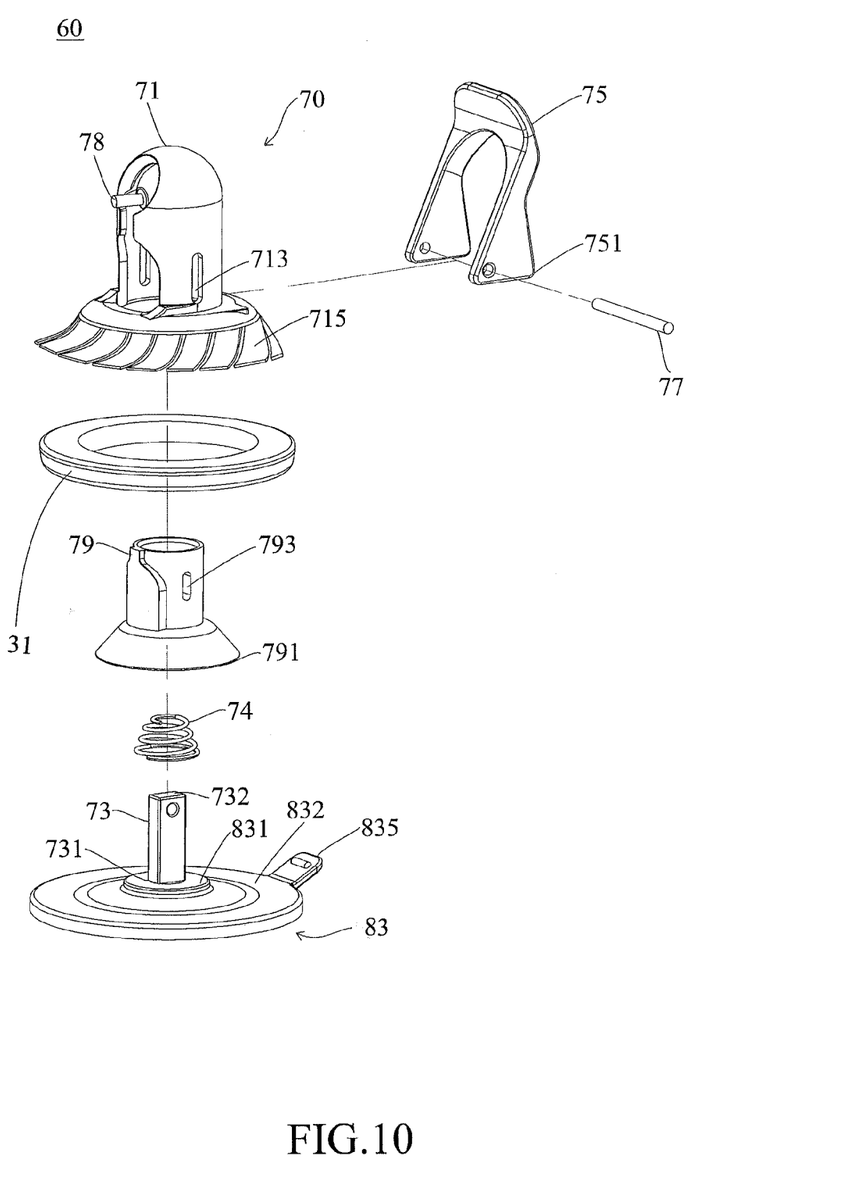
FIG. 10 is a schematic exploded view of the third embodiment of the present invention.
Figure 13:
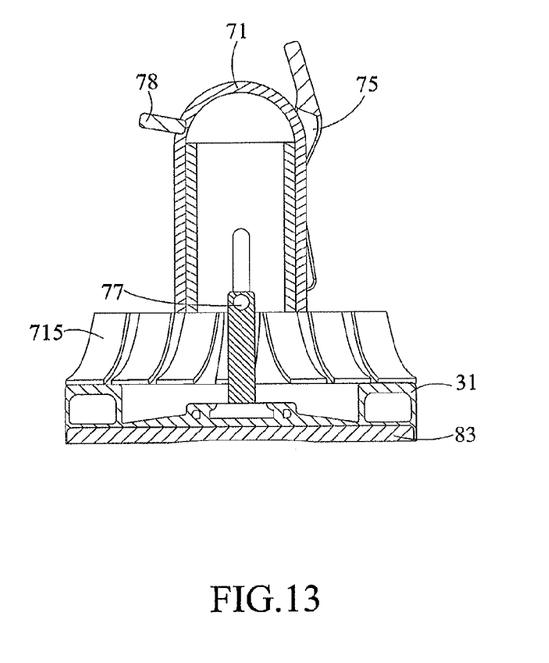
FIG. 13 is a schematic cross-sectional view of the holder of the third embodiment in an unlocked status.

Another holder 60 is disclosed in the third embodiment of the present invention, which has a deformable body 31 integrated with the locking module to deliver a similar effect. As shown in FIGS. 10 and 13, the holder 60 includes a locking module 70, a rod 73, a deformable body 31 and an adhesive layer 83. The adhesive layer 83 has a central portion 831 and an edge portion 832. A first end 731 of the rod 73 is connected to the central portion 831 of the adhesive layer 83. The locking module 70, which is disposed on the adhesive layer 83, is adapted to provide a force against the edge portion 832 of the adhesive layer 83 to attach the adhesive layer 83 onto the surface of the object, thereby mounting the holder 60 onto the object.

In more detail, the locking module 70 includes an outer housing 71 and a plurality of strip structures 715. The plurality of strip structures 715 are spaced from each other and extend from the outer housing 71 to thrust against the edge portion 832 of the adhesive layer 83. The strip structures 715 are formed as a deformable structure, so that when the object substantially has a non-flat surface contour, the strip structures 715 can adaptively deform to match the surface contour and apply the force to the edge portion 832 of the adhesive layer 83 evenly, thereby causing the deformation of the edge portion 832 along the surface contour.

Like the previous embodiment, the locking module 70 further includes a handle 75 which is pivoted to the second end 732 of the rod 73 by the pivot 77. The handle 75 further has a fulcrum end 751. When the handle 75 is pressed down by the user to drive the holder 60 into the locked status, the fulcrum end 751 will lean against the outer housing 71 exactly so that the outer housing 71 is pressed against the edge portion 832 of the adhesive layer 83 via the strip structures 715. Meanwhile, with the fulcrum end 751, the pivot 77 is lifted upwards by the handle 75 to slide upwards along the first slot 713 of the outer housing 71, thereby lifting the rod 73. Consequently, a low-pressure space is formed between the adhesive layer 83 and the object. Additionally, the adhesive layer 83 may also include a first layer and a second layer which are preferably formed integrally. The second layer wraps the first end 731 of the rod 73, while the first layer is adhesive to be mounted onto a patterned surface.

Similarly, the holder 60 further includes a connecting module 78 disposed on the locking module 70 for connection with a handheld electronic device (not shown). The holder 60 may also include an elastic member 74 and a release member 835, which are similar to those of the previous embodiments and thus will not be described again herein. More preferably, this embodiment may also include an inner shell 79, which has a rim 791 and a second slot 793 for the pivot to pass therethrough. The inner shell 79 may be, along with the outer housing 71, pressed downwards against the adhesive layer 83 to have the low-pressure space concentrated towards the central portion 831, thereby improving the stability.

According to the above descriptions, by use of the deformable body or the deformable outer housing, the holder disclosed in the present application can apply a force evenly to the edge of the sucker. Accordingly, the holder of the present application may be used with various curved surfaces to provide a desirable attachment effect; and when an adhesive layer is adopted, the holder may further be mounted onto patterned surfaces. Moreover, for the holder of the present application, the range of the low-pressure region is shrunken and, therefore, the distance between the low-pressure region and the edge of the adhesive layer is enlarged so that when the holder is mounted onto a surface of an object, it is easier to maintain the low-pressure space. Hence, it is less likely for the holder to be separated even when being shaken by an external force, thereby further improving the suction stability thereof.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A holder for mounting onto a surface of an object, the holder comprising:
    a sucker comprising an adhesive layer and a deformable body, wherein the adhesive layer comprises a first layer and a second layer, and the deformable body having a ring shape defining a cavity, the deformable body is disposed about a perimeter of the adhesive layer, and the cavity is disposed only about the on the edge of the adhesive layer;
    a rod having a first end connecting to the sucker; and
    a locking module disposed on the sucker to lift the rod for operatively affixing the sucker onto the object
    wherein the first layer is adhesive, the second layer wraps the first end of the rod, and the cavity is filled with a fluid or a plurality of tiny particles.

2. The holder as claimed in claim 1, wherein the first layer and the second layer are integrated.

3. The holder as claimed in claim 1, wherein the adhesive layer and the deformable body are integrated.

4. The holder as claimed in claim 1, wherein the locking module further comprises:
    an outer housing disposed on the sucker, the outer housing having a first slot;
    a pivot passing through the first slot; and
    a handle pivotally connecting to a second end, which is opposite to the first end, of the rod by the pivot, wherein the handle further has a fulcrum end to lean against the outer housing for lifting the rod when the handle is driven.

5. The holder as claimed in claim 4, wherein the locking module further comprises a plurality of strip structures extending from the outer housing and being spaced with intervals, the strip structures peripherally thrusting against the sucker.

6. The holder as claimed in claim 4, wherein the locking module further comprises an inner shell having a second slot for the pivot passing therethrough, the inner shell downwards thrusting against the sucker along with the outer housing.

7. The holder as claimed in claim 1, further comprising a connecting module disposed on the locking module for connecting with a handheld electronic device.

8. The holder as claimed in claim 1, wherein the surface is a non-flat surface.

* * * * *